US012592534B2

(12) United States Patent
Soljacic et al.

(10) Patent No.: US 12,592,534 B2
(45) Date of Patent: Mar. 31, 2026

(54) METHODS AND APPARATUS TO GENERATE MACROSCOPIC FOCK AND OTHER SUB-POISSONIAN STATES OF RADIATION

(71) Applicants:Massachusetts Institute of Tecnology, Cambridge, MA (US); Technion Research & Development Foundation Limited, Haifa (IL)

(72) Inventors: Marin Soljacic, Belmont, MA (US); Ido Kaminer, Haifa (IL); Nicholas Rivera, Somerville, MA (US); Jamison Sloan, Somerville, MA (US); Yannick Salamin, Arlington, MA (US)

(73) Assignees: MASSACHUSETTS INSTITUTE OF TECHNOLOGY, Cambridge, MA (US); TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 221 days.

(21) Appl. No.: 18/283,400

(22) PCT Filed: Apr. 12, 2022

(86) PCT No.: PCT/US2022/024403
§ 371 (c)(1),
(2) Date: Sep. 21, 2023

(87) PCT Pub. No.: WO2022/240535
PCT Pub. Date: Nov. 17, 2022

(65) Prior Publication Data
US 2024/0297472 A1 Sep. 5, 2024

Related U.S. Application Data

(60) Provisional application No. 63/271,952, filed on Oct. 26, 2021, provisional application No. 63/177,548, filed on Apr. 21, 2021.

(51) Int. Cl.
*H01S 1/00* (2006.01)

(52) U.S. Cl.
CPC ...................................... *H01S 1/00* (2013.01)

(58) Field of Classification Search
CPC ............ H01S 1/00; H01S 1/02; G02F 1/3523; G06N 10/40
See application file for complete search history.

(56) References Cited

U.S. PATENT DOCUMENTS

| 4,737,960 A | 4/1988 | Tsang |
| 5,661,074 A | 8/1997 | Tischler |

(Continued)

FOREIGN PATENT DOCUMENTS

| EP | 2846421 A1 | 3/2015 |

OTHER PUBLICATIONS

"Charge-Qubit-Resonator-Interface-Based Nonlinear Circuit QED", Deshui Yu, Sep. 18, 2018, https://arxiv.org/abs/1809.06542, (Year: 2018).*

(Continued)

*Primary Examiner* — Jeffrey M Shin
(74) *Attorney, Agent, or Firm* — Nields, Lemack & Frame, LLC

(57) ABSTRACT

A principle which enables the generation of macroscopic Fock and sub-Poissonian states is disclosed. Generic components of the system include: an electromagnetic structure (possessing one or more electromagnetic resonances), a nonlinear electromagnetic element (such as a nonlinear crystal near or inside the structure), and a source of light. In one embodiment, stimulated gain is used to create large numbers of photons in a cavity, but with very low photon number noise (uncertainty) in the cavity, and thus acts as a Fock laser. This Fock laser is capable of producing these states due to a very sharp intensity-dependent gain (or loss)

(Continued)

COMPONENTS OF A FOCK LASER that selects a particular photon number. The disclosed system and method are robust against both atomic and optical decoherence. Various examples of the new Fock laser design are also described.

18 Claims, 5 Drawing Sheets

(56) References Cited

U.S. PATENT DOCUMENTS

| | | | |
|---|---|---|---|
| 5,757,837 A | 5/1998 | Lim et al. | |
| 6,097,741 A | 8/2000 | Lin et al. | |
| 7,813,387 B2 | 10/2010 | Pedersen et al. | |
| 2009/0116089 A1 | 5/2009 | Bogoni et al. | |
| 2011/0002574 A1* | 1/2011 | Bermel | G02B 6/1225 |
| | | | 977/774 |
| 2017/0092834 A1* | 3/2017 | Fong | G01J 5/20 |
| 2024/0195140 A1 | 6/2024 | Soljacic et al. | |
| 2025/0284176 A1 | 9/2025 | Rivera et al. | |

OTHER PUBLICATIONS

Charge-Qubit-Resonator-Interface-Based Nonlinear Circuit QED (Year: 2018).*

Arkhipov et al., Experimental detection of nonclassicality of single-mode fields via intensity moments. Opt Express. Dec. 26, 2016;24(26):29496-29505.

Hofheinz et al., Generation of Fock states in a superconducting quantum circuit. Nature. Jul. 17, 2008;454(7202):310-4.

Isogai et al., Frequency Dependent Squeezing Roadmap toward 10dB. Massachusetts Institute of Technology, Oct. 2017.

Jin et al., Noise spectrum of a quantum dot-resonator lasing circuit. New Journal of Physics. Feb. 28, 2013;15:15 pages.

Kitching et al., "Amplitude noise reduction in semiconductor lasers with weak, dispersive optical feedback.", Optics Letters, vol. 19, No. 17, pp. 1331-1333, Sep. 1994.

Machida et al., Observation of Sub-Poissonian Photoelectron Statistics in a Negative Feedback Semiconductor Laser. Mar. 15, 1986;57(4):290-6.

Ritsch, Quantum noise reduction in lasers with nonlinear absorbers. Quantum Optics. Apr. 1990;2(2):189-203.

Yu et al., "Ultra-coherent Fano laser based on a bound state in the continuum.", Nature Photonics, vol. 15, pp. 758-764, Oct. 2021.

International Search Report and Written Opinion mailed Dec. 16, 2022 in corresponding PCT application No. PCT/US2022/024403.

International Search Report and Written Opinion mailed Aug. 11, 2022 in co-pending PCT application No. PCT/US2022/024400.

* cited by examiner

COMPONENTS OF A FOCK LASER

CAVITY SPECTRUM

INTENSITY-DEPENDENT GAIN AND LOSS

METHODS AND APPARATUS TO GENERATE MACROSCOPIC FOCK AND OTHER SUB-POISSONIAN STATES OF RADIATION

This application claims priority to U.S. Provisional Patent Application Ser. No. 63/177,548, filed Apr. 21, 2021 and U.S. Provisional Patent Application Ser. No. 63/271,952, filed Oct. 26, 2021, the disclosures of which are incorporated by reference in their entireties.

This invention was made with government support under FA9550-20-1-0115 awarded by the Air Force Office of Scientific Research, and W911NF-18-2-0048 awarded by the U. S. Army Research Office. The government has certain rights in the invention.

FIELD

Apparatus for the generation of sub-Poissonian states of radiation at microwave frequencies are disclosed.

BACKGROUND

Macroscopic quantum states of light remain among the most important goals of quantum science and engineering. One specific example that is of interest is number (or Fock) states of light. Number (or Fock) states of light, are of great interest for both fundamental science and quantum technologies. However, the generation and stabilization of large-number Fock states remains a long-standing open problem. A single mode Fock state, being an energy eigenstate of the radiation field, is the most basic state of light. Such states, having exactly defined numbers of photons, are in high demand for applications in quantum spectroscopy, metrology, and communication. Large-number Fock states will allow sensitive quantum spectroscopies with minimal noise, yet have sufficient intensity to provide observable signal, and even access nonlinear optical phenomena. They are considered important both as means to store quantum information, and as elements for optical quantum computing. They are also a workhorse state, allowing more complex states to be built from them, as shown recently for the case of two-photon states. Such states are also useful for bosonic quantum computation, in which the logical element is a quantum harmonic oscillator, such as a low loss microwave (superconducting) cavity. Numerous other applications could also be enabled by Fock states. In each case, the Fock state can be used to perform quantum simulation in fields such as quantum chemistry, where roto-vibrational spectra of molecules can be calculated.

Fock states are also, by their nature, very challenging to generate, let alone stabilize. Part of the reason Fock states are difficult to generate is that very few interactions between light and matter naturally select Fock states, as there is typically no mechanism selecting a particular photon number. Relatedly, they are also very fragile, often destabilizing at a rate proportional to the number of photons. For example, loss introduces photon number uncertainty into a cavity Fock state, as it is not known when a photon is lost. If one attempted to restore the state using gain, or instead attempted to amplify a small Fock state, the photon number uncertainty would again increase, as it is not known when a photon is emitted.

Many approaches to generating Fock states have been investigated theoretically and experimentally. For example, a Fock state can be built up transiently, before cavity losses set in, as has been demonstrated in state-of-the-art coherent-control experiments. This has led to approximate Fock states at microwave frequencies of roughly 10 photons (a record). A few other exciting schemes, applied at microwave frequencies, include the "micromaser" and quantum feedback protocols.

Therefore, it would be beneficial if there were a system and method that is capable of generating Fock or sub-Poissonian states of radiation. Further, it would be advantageous if this can be achieved at microwave frequencies.

SUMMARY

A principle which enables the generation of macroscopic Fock and sub-Poissonian states is disclosed. Generic components of the system include: an electromagnetic structure (possessing one or more electromagnetic resonances), a nonlinear electromagnetic element (such as a nonlinear crystal near or inside the structure), and a source of light. In one embodiment, stimulated gain is used to create large numbers of photons in a cavity, but with very low photon number noise (uncertainty) in the cavity, and thus acts as a Fock laser. This Fock laser is capable of producing these states due to a very sharp intensity-dependent gain (or loss) that selects a particular photon number. The disclosed system and method are robust against both atomic and optical decoherence. Various examples of the new Fock laser design are also described.

According to one embodiment, an apparatus for the generation of sub-Poissonian states of radiation at microwave frequencies is disclosed. The apparatus comprises a microwave resonator, and a gain medium; wherein the apparatus exhibits a sharp frequency dependent gain or loss. In certain embodiments, the apparatus further comprises an absorbing medium, which absorbs strongly at microwave frequencies, wherein the gain medium, the absorbing medium, or the microwave resonator exhibits a sharp frequency dependent gain or loss. In some embodiments, the microwave resonator comprises a nonlinear energy spectrum. In certain embodiments, the nonlinear energy spectrum is realized by deep-strongly coupling a quantum system to a microwave resonator with a linear spectrum. In some embodiments, the quantum system comprises a Josephson junction. In some embodiments, the microwave resonator comprises a microwave cavity formed by coupling a linear microwave cavity to a qubit under deep-strong coupling to achieve the sharp frequency dependent gain. In some embodiments, the coupling coefficient between the qubit and the microwave cavity is at least two. In some embodiments, the microwave resonator is coupled to a microwave filter with a sharp band-stop to achieve the sharp frequency dependent loss. In certain embodiments, the gain medium comprises microwave active atoms/molecules or superconducting qubits. In some embodiments, the nonlinear energy spectrum is realized by coupling a quantum system to a linear microwave resonator in the dispersive strong-coupling limit to induce a Kerr nonlinearity. In some embodiments, a reduction in noise, as measured by Fano factor, of a photon distribution of the microwave resonator is at least 25%, and wherein an average photon number in the microwave resonator is at least 2. In some embodiments, a reduction in noise, as measured by Fano factor, of a photon distribution of the microwave resonator is at least 50%, and wherein an average photon number in the microwave resonator is at least 2. In some embodiments, a reduction in noise, as measured by Fano factor, of a photon distribution of the microwave resonator is at least 75%, and wherein an average photon number in the microwave resonator is at least 2. In some embodiments, a reduction in noise, as measured by Fano factor, of a photon distribution of the microwave resonator is at least 90%, and wherein an average photon number in the microwave resonator is at least 2. In some embodiments, a reduction in noise, as measured by Fano factor, of a photon distribution of the microwave resonator is at least 99%, and wherein an average photon number in the microwave resonator is at least 2.

BRIEF DESCRIPTION OF THE DRAWINGS

For a better understanding of the present disclosure, reference is made to the accompanying drawings, in which like elements are referenced with like numerals, and in which.

DETAILED DESCRIPTION

A new fundamental principle which can enable generation of macroscopic quantum states of light is disclosed. This principle may be used to generate large-number Fock states of the electromagnetic field (acting thus as a laser of Fock states or a "Fock laser"). In this disclosure, the term "Fock laser" is used to describe an apparatus that creates Fock states, or sub-Poissonian states of radiation at either optical or microwave frequencies. In certain embodiments, the term "Fock maser" is used to explicitly connote an apparatus that produces sub-Poissonian or Fock states at microwave frequencies.

First, definitions of sharp dependence of gain and loss and important figures of merit and quantities that can define the performance of the proposed devices are provided. A measure of sub-Poissonian light and Fock states (the latter being a special case of the former) is the Fano factor, $$F = \frac{(\Delta n)^2}{\langle n \rangle} \geq 0,$$

where $\langle n \rangle$ is the mean number of photons in the cavity (structure) and $\Delta n$ is the uncertainty in the photon number. Coherent states of light, and more generally Poissonian distributions of photon number, have F=1. Sub-Poissonian states of light have F<1 and Fock states, being maximally sub-Poissonian, have F=0. Noise reduction corresponds to F<1, and so statements of the form 99% noise reduction refer for example to F=0.01. In all of the Fock laser embodiments, it is the case that this Fano factor can be calculated from knowledge of the mean photon number, as well as the ratio of the intensity-dependent stimulated emission rate $G_n$ and loss rate $L_n$ (n is photon number or intensity). It can be determined that the uncertainty $$\Delta n = \left( \frac{G_{n+1}}{L_{n+1}} - 1 \right)^{-1/2}.$$

Based on this, it follows that:

$$F = \left( \langle n \rangle \left( 1 - G_{\langle n \rangle + 1} / L_{\langle n \rangle + 1} \right) \right)^{-1}.$$

Figure 1:
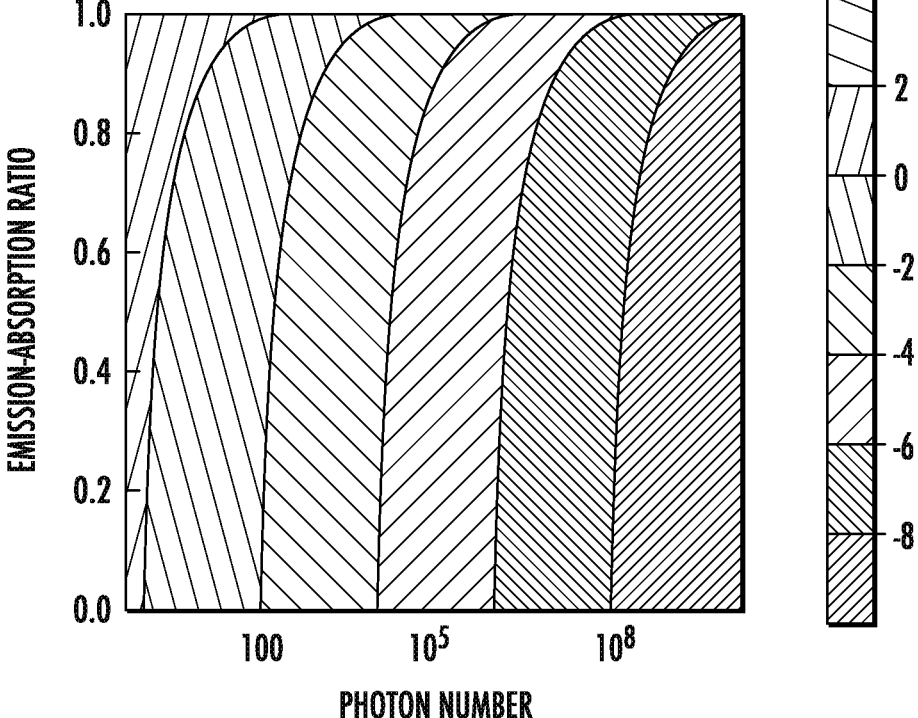
FIG. 1 is a chart showing the performance of a Fock laser in terms of two parameters.

In FIG. 1, the Fano factor is plotted as a function of the intracavity photon number and the "emission-absorption ratio" $G_{\langle n \rangle + 1} / L_{\langle n \rangle + 1}$. This ratio is somewhat analogous to the derivative of the gain-loss-ratio, taken at the steady-state operating point. Contours show different performances for different parameter regimes. A value of "0" means no noise reduction, while a value of "−2" means 99% noise reduction, and a value of "−4" means 99.99% noise reduction. As an example of the plot: for an intracavity photon number of $10^3$ and an emission-absorption ratio of 0.9 (10% change in gain and/or loss when photon number is changed by 1), the noise reduction is 99%.

The mean photon number also follows from the gain and loss-rates, satisfying the equation $G_{\langle n \rangle} = L_{\langle n \rangle}$. It may be envisaged that for a given laser device, the power (giving the intracavity photon number), and enough properties of the gain and loss to determine the gain and loss rates as a function of intensity may be measured, and thus any laser mode can be evaluated according to FIG. 1.

Based on the definition of Fano factor, systems may be designed that create devices with very low Fano factors. For example, a sharp gain may significantly affect the Fano factor. Note that F=($\langle n \rangle$ $(1 - G_{\langle n \rangle + 1} / L_{\langle n \rangle + 1})$)$^{-1}$. For the case of sharp gain, the following equation, $G_{\langle n \rangle + 1} = G_{\langle n \rangle} + \Delta G_{\langle n \rangle}$, may be used to describe the gain, while it is noted that $L_{\langle n \rangle + 1} \approx L_{\langle n \rangle}$. Since $G_{\langle n \rangle} = L_{\langle n \rangle}$, the Fano factor may be expressed as F=($\langle n \rangle$ $\times (-\Delta G_{\langle n \rangle} / G_{\langle n \rangle})$)$^{-1}$. Thus, for a fractional change in gain $|\Delta G_{\langle n \rangle} / G_{\langle n \rangle}|$ ("sharpness of gain") of $10^{-8}$ and $\langle n \rangle = 10^4, 10^8, 2 \times 10^8, 10^{10}, 10^{12}$, Fano factors of $10^4, 1, 0.5, 0.01, 10^{-4}$, respectively are obtained. Alternative values of $(-\Delta G_{\langle n \rangle} / G_{\langle n \rangle})$ are readily accommodated by this formula. For example, "sharp gain" may be defined as $|\Delta G_{\langle n \rangle} / G_{\langle n \rangle}| > 10^{-8}$. In certain embodiments, "sharp gain" may be defined as $|G_{\langle n \rangle} / G_{\langle n \rangle}| > 10^{-4}$. In other embodiments, "sharp gain" may be defined as $|\Delta G_{\langle n \rangle} / G_{\langle n \rangle}| > 10^{-2}$.

Similarly, sharp loss may also significantly affect the Fano factor. For the case of sharp loss, defining $L_{\langle n \rangle + 1} = L + \Delta L_{\langle n \rangle}$ and noting $G_{\langle n \rangle + 1} \approx G_{\langle n \rangle}$, leads to =($\langle n \rangle \times$ $(\Delta L / L_{\langle n \rangle})$)$^{-1}$. Thus, for a fractional change in loss $\Delta L_{\langle n \rangle} / L_{\langle n \rangle}$ ("sharpness of loss") of $10^{-8}$ and $\langle n \rangle = 10^4, 10^8, 2 \times 10^8, 10^{10}, 10^{12}$, Fano factors of $10^4, 1, 0.5, 0.01, 10^{-4}$, respectively, are obtained. Alternative values of $(\Delta L_{\langle n \rangle} / L_{\langle n \rangle})$ are

5

6 readily accommodated by this formula. For example, "sharp loss" may be defined as $|\Delta L_{\langle n \rangle}/L_{\langle n \rangle}|>10^{-8}$. In certain embodiments, "sharp loss" may be defined as $|L_{\langle n \rangle}/L_{\langle n \rangle}|>10^{-4}$. In other embodiments, "sharp loss" may be defined as $|\Delta L_{\langle n \rangle}/L_{\langle n \rangle}|>10^{-2}$.

Thus, by creating a structure with a sharp gain or a sharp loss, a Fock laser or maser may be created.

Figure 2A:
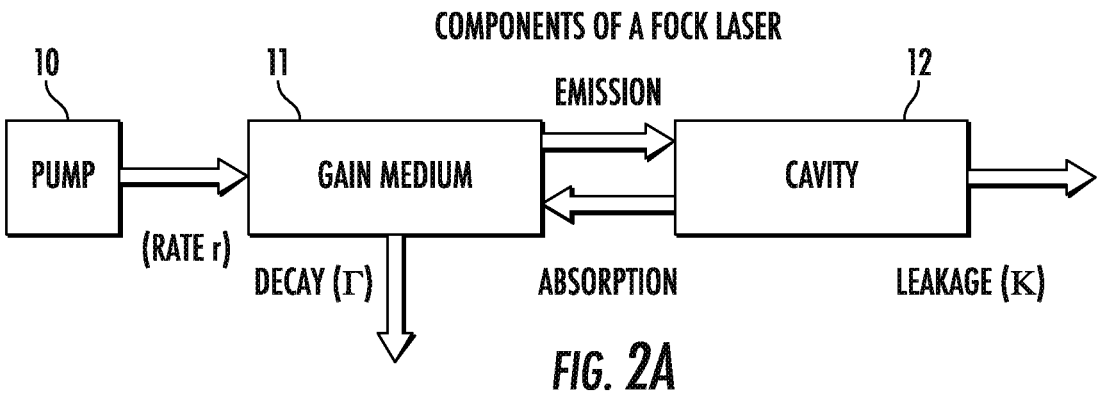
FIG. 2A shows a general schematic of a Fock laser.

An embodiment of this structure is shown in FIG. 2A. The Fock laser comprises a cavity 12, gain medium 11, and pump 10. The cavity 12 hosts a mode of the EM field, which behaves as a single quantum harmonic oscillator. If the gain medium 11 provides gain at frequency ω, coinciding with that of the cavity 12, it will resonantly excite the cavity 12 (by stimulated emission) from a state with n photons to a state with n+1 photons. If the gain is off-resonance, then stimulated emission is ineffective at giving energy to the EM field.

Figure 2B:
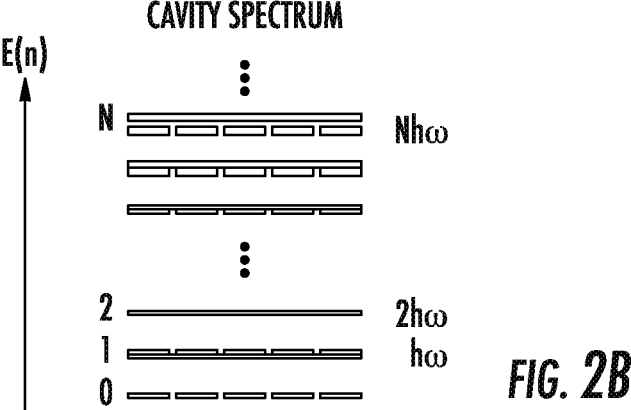
FIG. 2B shows uneven spaced energy levels within the cavity.

Importantly, if the cavity 12 is nonlinear, so that the energy difference between n and n+1 photons is intensity-dependent, then the gain may become less resonant, and thus saturate, as the EM field gains energy. Now, imagine that a nonlinearity turns the cavity 12 into a "suddenly anharmonic oscillator" which has evenly-spaced energies ℏω, up to a critical excitation level $n_{crit}$, after which, the next transition (to $n_{crit}+1$) is very different in frequency from ℏω, as shown in FIG. 2B. It follows that beyond a sufficiently high pump, the system, in its steady state, will be "stuck" with photon numbers near $n_{crit}$ as it cannot exceed this value, leading to a distribution strongly resembling a Fock state. The key effect is that the stimulated emission rate has been made sharply dependent on intensity. This may happen by having a very high-order nonlinearity (e.g., a nonlinearity with its lowest order being for example fifth-, seventh- or higher order). It may also happen (as is relevant for embodiments at optical frequencies) by coupling a low-order (e.g., third-order nonlinearity) to a cavity 12 whose gain or loss has a sharp frequency dependence. The nonlinearity transforms a sharp frequency dependence of the gain or loss into a sharp photon-number or intensity-dependence of the gain or loss. This effect is called spectral-statistical coupling.

Figure 2C:
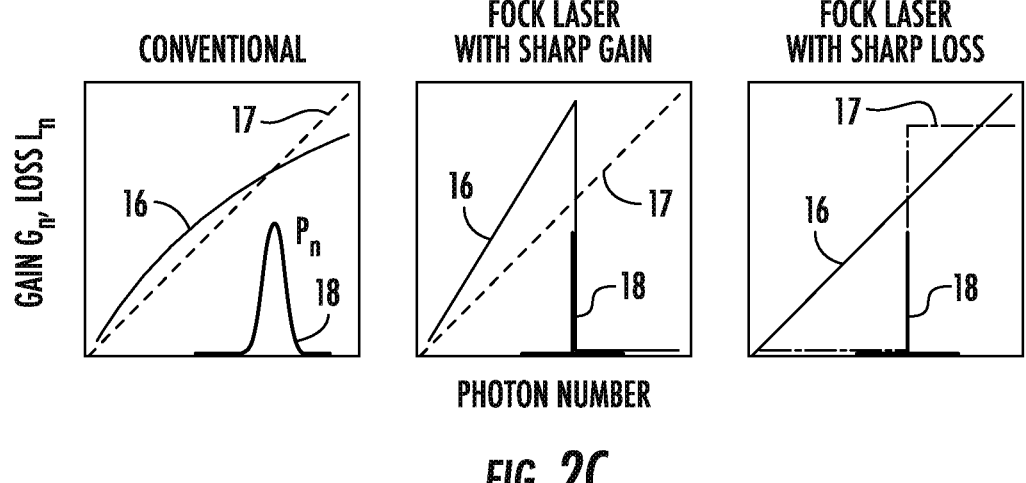
FIG. 2C shows gain and loss with different configurations.

FIG. 2C shows several examples of gain and loss. The leftmost graph shows a saturable gain 16 and loss 17 corresponding to a conventional laser based on a two-level gain medium leading to a photon number 18 having Poissonian statistics well-above threshold. The center graph shows sharply varying gain 16 and linear loss 17, leading to a sharp reduction of photon number 18 uncertainty, for pumping well above threshold. The right graph is similar to the middle graph, except with linear gain 16 and sharply varying loss 17.

This arrangement of components, produces inside the laser cavity, a Fock state with many photons in it, or a close approximate of a Fock state such as a macroscopic sub-Poissonian state. With the addition of another element for gain-switching or Q-switching, this laser can produce macroscopic pulses of light with a well-defined number of photons, referred to as a "Fock pulse. In particular, by means of an ultrafast temporal modulation of the gain, such as by synchronously pumping the gain medium with an additional pulsed laser, the gain can be abruptly shut off, forcing the cavity Fock state to decay into the far field, becoming a far-field Fock pulse. Similarly, by ultrafast modulation of the loss, either actively, with electro-optic elements, or passively, with saturable absorbers, the loss can be abruptly increased, causing the cavity Fock state to leak out into a far-field Fock pulse.

Fock lasers may be created to operate at microwave frequencies.

At microwave frequencies, Fock lasing and macroscopic sub-Poissonian cavity fields may be realized in several ways.

In one embodiment, the microwave cavity is deep-strongly coupled to a single qubit, to form a strongly nonlinear energy spectrum, as explained in more detail below. This deep-strong coupling configuration may be realized by coupling a flux qubit to a microwave resonator (as has been demonstrated experimentally). Thus, according to one embodiment, the Fock laser is based on cavity-quantum electrodynamical interactions in the deep-strong coupling regime, and may be realized at microwave frequencies.

The gain medium can be composed of either microwave active atoms/molecules, or additional superconducting qubits. Gain based on superconducting qubits may be constructed from one or many superconducting qubits, and explicit parameters are disclosed below.

In another embodiment, the microwave cavity may comprise an integrated Kerr nonlinearity (at microwave frequencies) and a microwave gain or microwave cavity loss that depends sharply on frequency. In some embodiments, the nonlinearity may be realized based on strong coupling of a superconducting qubit to a microwave resonator, which is commonly achieved in experiments using transmon, charge, and flux qubits. In certain embodiments, the superconducting qubit may comprise a Josephson junction. In certain embodiments, a sharply frequency dependent loss may be realized by coupling the maser resonator to a microwave filter with a sharp stop-band (e.g., Lorentzian or more general Butterworth filters).

The nonlinearity for Fock lasing at microwave frequencies (e.g., Fock masing) is unlike any found naturally (particularly in optics), as its very sharp intensity dependence makes it a very high-order (effectively infinite-order) nonlinearity. Surprisingly however, such a nonlinearity can be realized in cavity/circuit QED systems when the light-matter coupling coefficient (g) is sufficiently strong. Consider a two-level emitter coupled to a cavity through the Rabi Hamiltonian:

$$H/\hbar = \left( \frac{\omega_{0,em}}{2}\sigma_z + \omega a^\dagger a + g\sigma_x(a+a^\dagger) \right) \equiv \frac{\omega_{0,em}}{2}\sigma_z + H_{DSC}/\hbar.$$

where H is the Hamiltonian, $\omega_{0,em}$ is the emitter (qubit) frequency, ω is the photon frequency, g is the coupling constant, $\sigma_{z(x)}$ is the Pauli Z(X)-matrix, $a^{(\dagger)}$ is the annihilation (creation) operator, ℏ is the reduced Planck constant, and $H_{DSC}$ is the deep-strong coupling Hamiltonian.

Figures 3A, 3B, 3C:
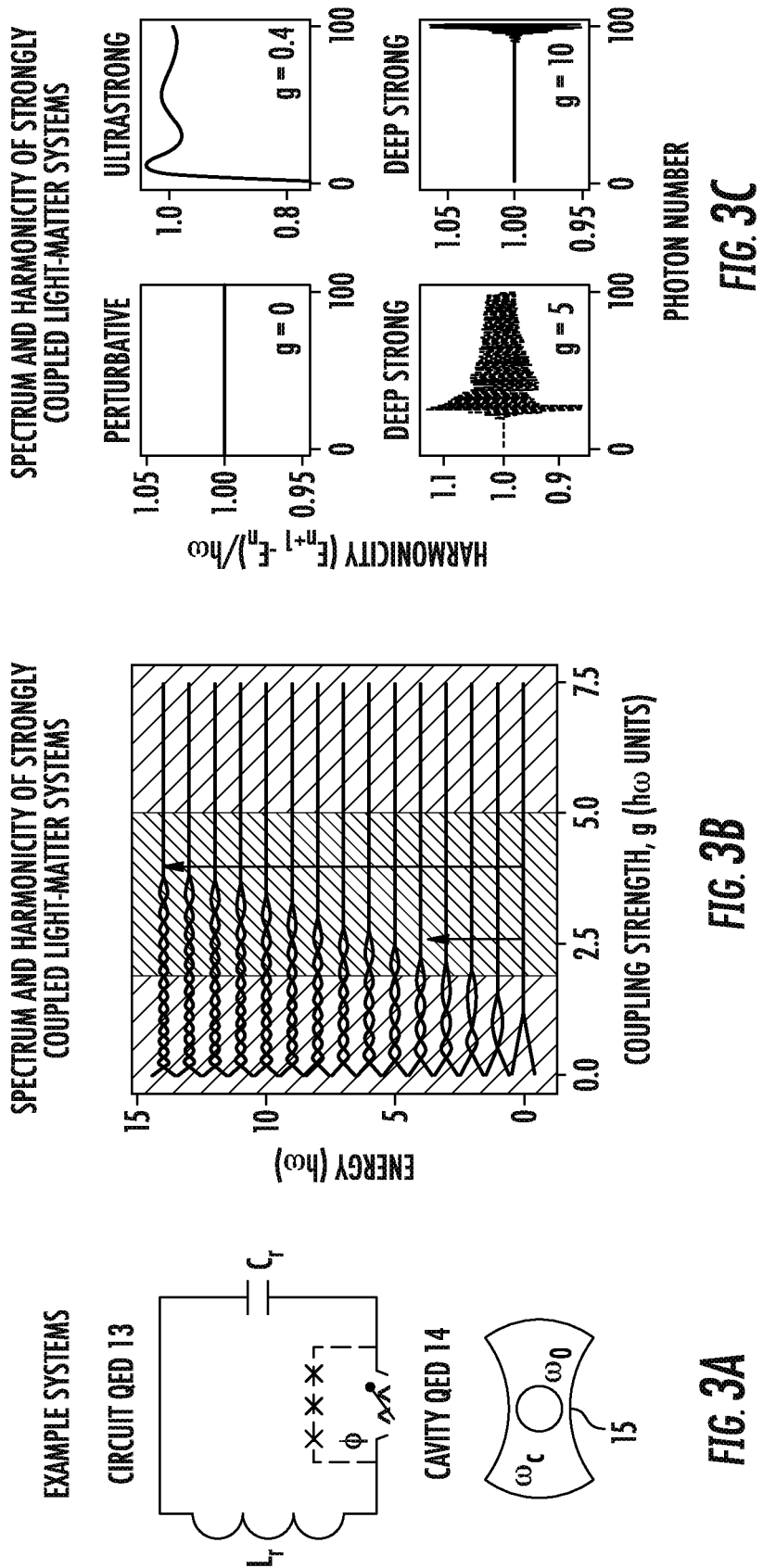
FIG. 3A shows an example system with a coupling between the emitter and the electromagnetic resonance.
FIG. 3B shows the spectrum of energy as compared to coupling strength.
FIG. 3C shows the spectrum of the Rabi Hamiltonian as a function of coupling.

The DSC coupling regime is given by g>>ω, which has recently been realized in systems of flux qubits coupled to LC resonators, as shown in FIG. 3A. In other words, such a system can be realized by non-perturbatively coupling an emitter to an electromagnetic resonance (e.g., a flux qubit in circuit QED, or through cavity QED). FIG. 3A shows a QED circuit 13, an optical cavity 14 coupled to a two-level system 15, which may be approximated by a physical system, such as an atom, molecule or artificial atom.

The energy spectrum of such a system is shown in FIG. 3B. As can be seen, for large g, the spectrum is evenly spaced up a point for which the energy differences then grow rapidly. This occurs because for large g, the eigenstates of $H_{DSC}/\hbar = \omega a^\dagger a + g\sigma_x(a+a^\dagger)$ are displaced Fock states $|\psi_{n\pm}\rangle = D(\pm g)|n\rangle$ with energies $E_{n\pm} = n\hbar\omega$. D is the displacement operator, such that $D(g) = e^{g(a^\dagger - a)}$. Deviations from equal spacing, such as from the term $(\omega_{0,em}/2)\sigma_z$, which becomes significant for large n, i.e., when the displaced Fock states $|\psi_{n\pm}\rangle$ have significant overlap with each other. Quantitatively, the energy for n quanta ("DSC photons") is given as $$E_{n\pm} \approx \hbar\omega\left(n \pm \frac{1}{2}e^{-2g^2}L_n(4g^2)\right),$$

with $L_n$ the Laguerre polynomial of order n.

FIG. 3C shows the spectrum of the Rabi Hamiltonian as a function of coupling coefficient, normalized to the emitter frequency. For very weak coupling, the spectrum is harmonic, while in the ultra-strong coupling regime, the spectrum is anharmonic. In the deep strong coupling regime, the spectrum is harmonic up to a critical excitation level, for which it rapidly becomes anharmonic.

An explanation of what happens when a gain medium is coupled to this suddenly anharmonic oscillator is now described. Modeling the gain as a two-level gain medium with $T_2 = 2T_1 = \Gamma^{-1}$, pumped at rate r, and interacting with the cavity field with coupling constant $\epsilon$, an equation of motion for the diagonal components of the reduced density matrix $\rho_n \equiv \rho_{n,n}$ (the probability of having n DSC photons) can be determined. It is found to be:

$$\dot{\rho}_n = \frac{2nr_a\epsilon^2}{\Gamma^2 + F(n)}\rho_{n-1} - \left(\frac{2(n+1)r_a\epsilon^2}{\Gamma^2 + F(n+1)} + \kappa n\right)\rho_n + \kappa(n+1)\rho_{n+1},$$

where the nonlinearity—

$$F(n) = 4n\epsilon^2 + \frac{1}{4}\omega^2 e^{-4g^2}\left(L_n(4g^2) - L_{n-1}(4g^2)\right)^2$$

—is closely related to the energy spectrum of the DSC system.

In the DSC regime, F(n) is small for $n \ll n_{crit} \sim g^2$ and grows rapidly for $n > n_{crit}$, causing the stimulated emission rate $$R_n = \frac{2nr_a\epsilon^2}{\Gamma^2 + F(n)}$$

to drop correspondingly rapidly beyond $n_{crit}$. The resulting steady-state photon probabilities are $$\rho_n = \frac{1}{Z}\left(\frac{2r\epsilon^2}{\kappa\Gamma^2}\right)^n \prod_{m=1}^{n}\frac{1}{1 + F(n)/\Gamma^2}$$

Figures 4A, 4B, 4C:
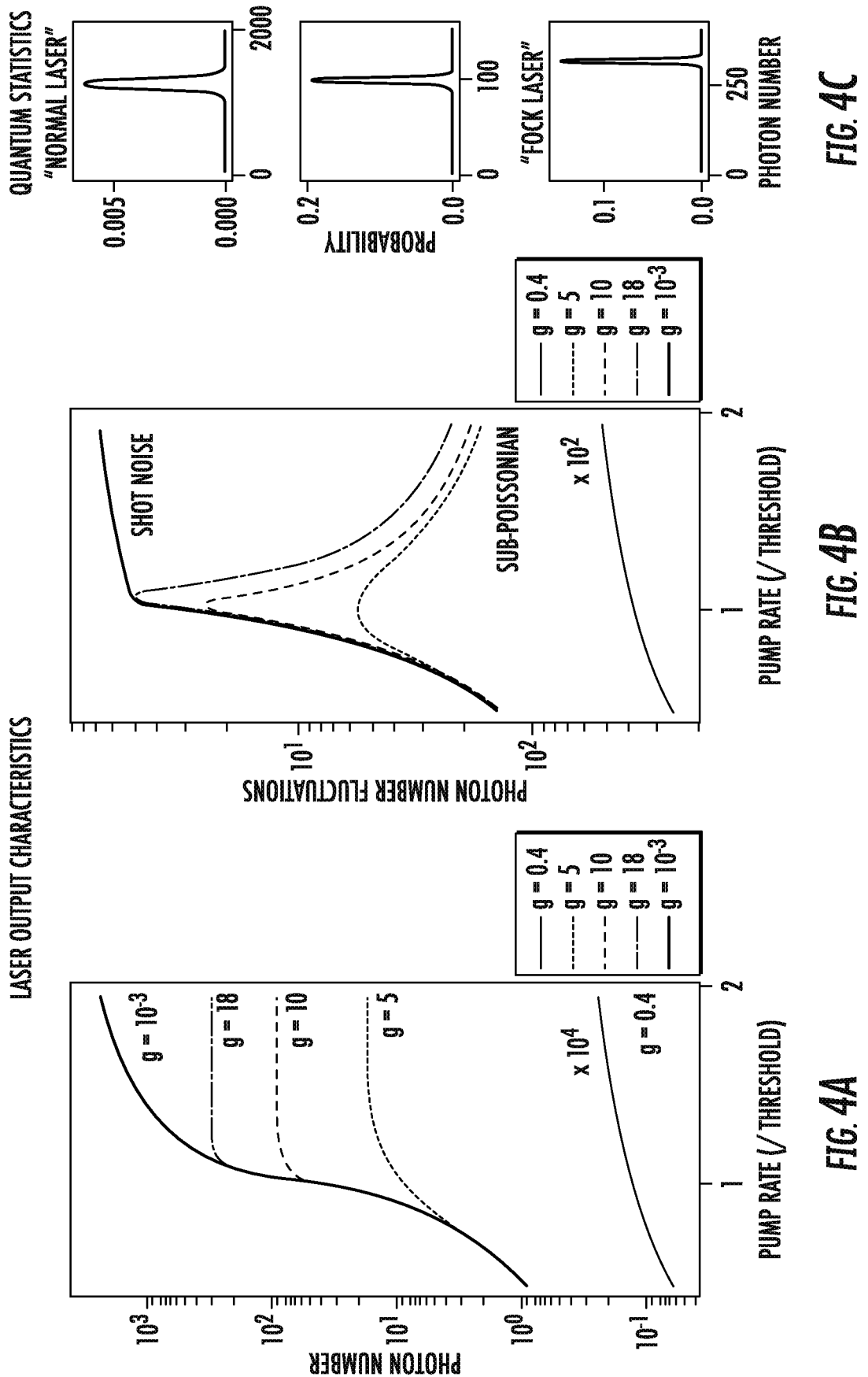
FIG. 4A shows a graphs of photon number as a function of pump rate for different coupling regimes.
FIG. 4B shows a graphs of photon number fluctuation as a function of pump rate for different coupling regimes.
FIG. 4C shows the quantum statistics associated with different coupling regimes.
Figure 5:
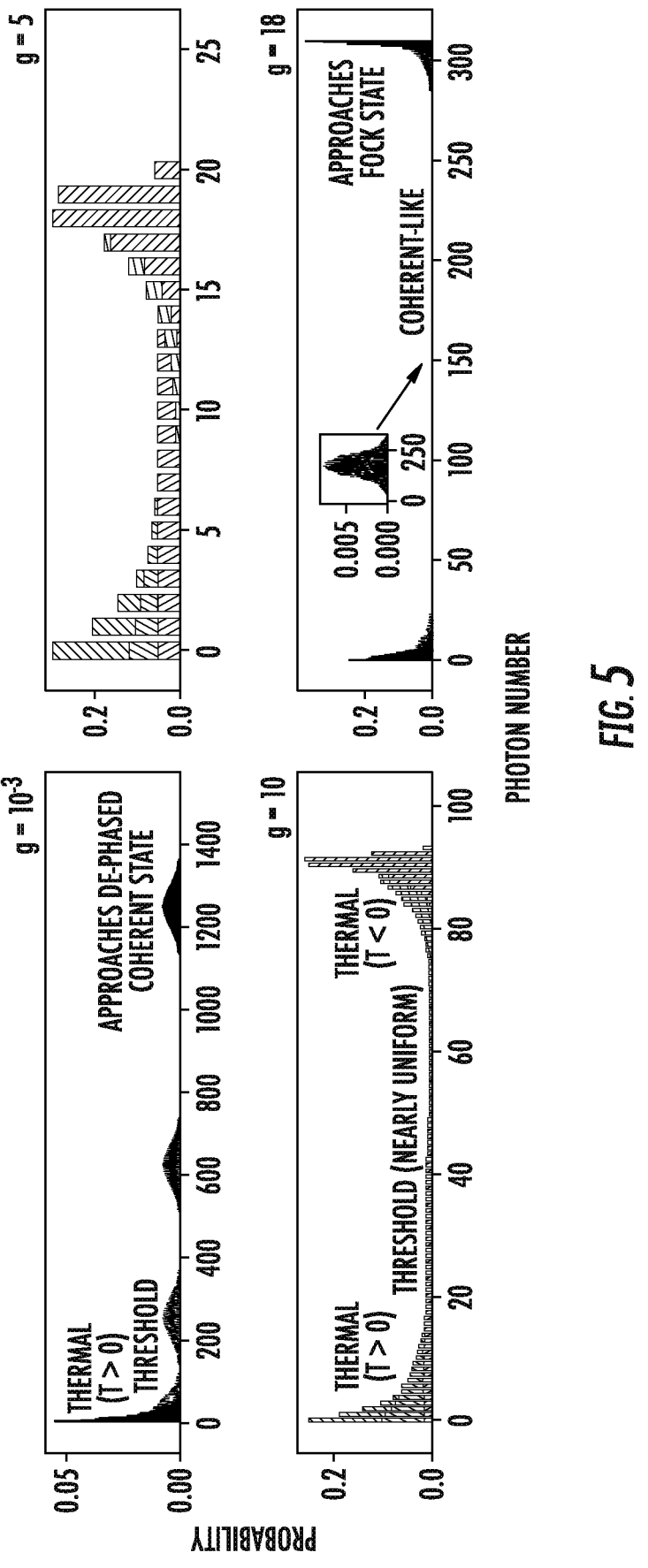
FIG. 5 shows photon probability distributions as a function of different pump strengths and different coupling strengths.

(where Z is a normalization constant) and leads immediately to the results shown in FIGS. 4 and 5.

FIGS. 4A-4B show the intra-cavity photon number and photon fluctuations for DSC in comparison with different coupling regimes, respectively. The corresponding photon statistics are also shown in FIG. 4C. In the weak coupling regime, the photon number, as a function of pump, follows the canonical "S-curve", which grows sharply beyond the threshold pump level, $r \geq r_{th} = \kappa\Gamma^2/2\epsilon^2$.

The fluctuations grow according to shot-noise (as $\sqrt{\langle n\rangle}$) above threshold, as expected. In contrast, the "Fock laser" (g=5, 10, 18), saturates (at $n_{crit} \sim g^2$), and the photon number fluctuations go to zero, leading to the quantum statistics of a Fock state, as shown in FIG. 4C. FIG. 5 further shows how the photon statistics evolve with pump and coupling coefficient. For weak coupling, the statistics evolve from thermal to coherent with increasing pump. For larger coupling, beyond threshold, the distribution of photons (for DSC) approaches that of a thermal state of negative temperature T. Such states, as the pump is increased (and $T \to 0^-$), approach states where only the highest-most level is filled, with minimal spread, which closely approximates a Fock state of $n_{crit}$ DSC photons.

Regarding the realization of the effect described herein, recent advances provide a path to realize these effects. In particular, recent work on realizing deep-strong coupling of superconducting qubits to a microwave (LC) resonator, may enable control over g from weak coupling to a value of roughly 2. With a g of 2, one can see from FIG. 3B that a Fock state of three or four excitations could be pumped. For g in the ultra-strong coupling regime, only one excitation can be created, as a manifestation of the conventional photon blockade effect. Thus, the behavior of the model from weak to deep strong coupling can already be realized. Regarding the gain medium, it is important to point out that while a gain medium having many two-level systems (e.g., microwave-active molecules) may be used, the exact same solution of the quantum laser equations may also be realized by a gain medium consisting of a single qubit which is weakly coupled to the same cavity as the strongly coupled qubit, provided that the gain from one atom is above threshold. Single-qubit gain is responsible for much of the exciting experiments on "one-atom lasers". Thus, a conceptually simpler—and perhaps more attractive—approach to realize these results is to consider a gain medium comprising a continuously pumped superconducting qubit which is weakly coupled to the same resonance as the strongly coupled qubit (so $\epsilon/\omega$, as defined above, should be much less than 1). In FIGS. 4-5, it is assumed that $\epsilon = 10^{-5}\omega$, and $\Gamma = 10^{-5}\omega$ Thus, for a single gain qubit, threshold is reached provided the quality factor of the resonator is above $5\times10^6$.

It is important to emphasize that suitable results (e.g., Fock states at microwave frequencies) can be realized over a broad range of system parameters. For example, there is little requirement on $\epsilon$ provided that $\epsilon \ll 1$ and $N\epsilon^2 > \Gamma\kappa$ with N the number of gain units and $\kappa$ the cavity losses. The requirement on $\Gamma$ is that it is small compared to the sudden anharmonicity of the deep-strong coupled cavity at large excitation numbers ($\sim g^2$), which is about 1%, so that $\Gamma \leq 10^{-2}$. Meanwhile, the Fock state number is dictated by g for $g \geq 2$ as $N_{Fock} \approx g^2$. To give a sense of other parameters that work: if g=5, this generates a Fock state of roughly 25 photons. If the gain is realized by a single superconducting qubit, so that N=1, then if $\Gamma = 10^{-3}$, Fock state generation is achieved for $\epsilon > 10^{-5.5}$ if $\kappa = 10^{-8}$ as in a cooled aluminum resonator or $\epsilon > 10^{-6.5}$ if $\kappa > 10^{-10}$ if the resonator is based on a superconducting material. To summarize the broadest requirements: the gain bandwidth $\Gamma \leq 10^{-2}$, the coupling $g \geq 2$, N=1-100 for superconducting gain. A Fock state of roughly 100 photons (over an order-of-magnitude compared to the state-of-the-art) is realized with g=10 and otherwise similar parameters. Regarding some of the more extremal values of g, it may be possible to realize these soon, given the rapidly increasing coupling constants that have been realized with superconducting qubits, and early estimates in this field suggesting the possibility of g values of roughly 20.

Thus, in one embodiment, the Fock laser, operable at microwave frequencies, comprises a qubit or a multi-level quantum system, a gain medium and a microwave resonator. In this disclosure, the term "microwave resonator" is defined as any system with at least one resonance at a microwave frequency. The microwave resonator may be an LC circuit or a microwave cavity. The gain medium can be composed of either microwave active atoms/molecules, or additional superconducting qubits. In certain embodiments, the microwave resonator may be deep-strongly coupled to a single qubit. In certain embodiments, this coupling is achieved by coupling a superconducting qubit to the microwave resonator. This superconducting qubit may be a flux, transmon or charge qubit. In certain embodiments, the coupling coefficient (g) between the microwave cavity and the qubit is at least 2. In some embodiments, the coupling (g) is at least 5. In some embodiments, the coupling (g) is at least 10.

In other embodiments, a sharp frequency dependent loss may be achieved by coupling the microwave resonator to a microwave filter with a sharp band-stop, such as a Lorentzian or Butterworth filter.

Further, in certain embodiments, an absorbing medium may be employed, wherein the absorbing medium absorbs strongly at microwave frequencies. For a sufficiently sharp absorption (in frequency), the loss will become sharply intensity-dependent in the presence of a nonlinearity. For example, consider an absorber whose absorption has Lorentzian frequency-dependence centered at frequency $\omega_0$ with width $\Gamma$. In the presence of a Kerr nonlinear medium where the resonator frequency depends on intensity as $\omega_n=\omega(1+2\beta n)$, the loss $L_n$ associated with the absorption takes the form $$L_n \sim \frac{\alpha n}{1 + [\omega(1 + 2\beta n) - \omega_0]^2/\Gamma^2}.$$

An example of an absorber at microwave frequencies would be a molecule with a rotational or hyperfine transition. A Josephson junction could also act as a microwave absorber if the energy difference between its ground and first excited states is $\hbar\omega_0$. Generally, any physical system with an accessible microwave transition could serve as the absorber.

The Fock laser, operable at microwave frequencies, may achieve a reduction of the noise, as measuring by Fano factor, of the photon distribution of the resonators by at least 25%, wherein the average photon number is at least 2. In certain embodiments, the reduction of the noise may be at least 50%, wherein the average photon number is at least 2. In certain embodiments, the reduction of the noise may be at least 75%, wherein the average photon number is at least 2. In certain embodiments, the reduction of the noise may be at least 90%, wherein the average photon number is at least 2. In certain embodiments, the reduction of the noise may be at least 99%, wherein the average photon number is at least 2.

The present system has many advantages in a variety of applications.

For example, because the Fock states produced here have minimal uncertainty in their intensity, they can be used to perform spectroscopy without shot noise. This limits the noise without compromising the signal since the Fock states are macroscopic here.

Additionally, small Fock states are also used at microwave frequencies as a resource to perform analog simulation of chemical properties of molecules, such as vibronic spectra. Large Fock states would allow the simulation of molecules that could not be simulated with the best computers today.

Finally, Fock states can be manipulated to generate other quantum mechanical states which are of interest in the above applications, especially computation and simulation.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An apparatus for the generation of sub-Poissonian states of radiation at microwave frequencies, comprising:
   a microwave resonator, and
   a gain medium;
   wherein the apparatus exhibits a sharp intensity dependent gain or loss.

2. The apparatus of claim 1, further comprising an absorbing medium, which absorbs strongly at microwave frequencies, wherein the gain medium, the absorbing medium, or the microwave resonator exhibits a sharp frequency dependent gain or loss.

3. The apparatus of claim 1, wherein the microwave resonator comprises a nonlinear energy spectrum.

4. The apparatus of claim 3, wherein the nonlinear energy spectrum is realized by deep-strongly coupling a quantum system to a microwave resonator with a linear spectrum.

5. The apparatus of claim 4, wherein the quantum system comprises a Josephson junction.

6. The apparatus of claim 1, wherein the microwave resonator comprises a microwave cavity formed by coupling a linear microwave cavity to a qubit under deep-strong coupling to achieve the sharp intensity dependent gain.

7. The apparatus of claim 6, wherein a coupling coefficient between the qubit and the microwave cavity is at least two.

8. The apparatus of claim 1, wherein the microwave resonator is coupled to a microwave filter with a sharp band-stop to achieve a sharp frequency dependent loss.

9. The apparatus of claim 1, wherein the gain medium comprises microwave active atoms/molecules or superconducting qubits.

10. The apparatus of claim 3, wherein the nonlinear energy spectrum is realized by coupling a quantum system to a linear microwave resonator in the dispersive strong-coupling limit to induce a Kerr nonlinearity.

11. The apparatus of claim 1, wherein a reduction in noise, as measured by Fano factor, of a photon distribution of the microwave resonator is at least 25%, and wherein an average photon number in the microwave resonator is at least 2.

12. The apparatus of claim 1, wherein a reduction in noise, as measured by Fano factor, of a photon distribution of the microwave resonator is at least 50%, and wherein an average photon number in the microwave resonator is at least 2.

13. The apparatus of claim 1, wherein a reduction in noise, as measured by Fano factor, of a photon distribution of the microwave resonator is at least 75%, and wherein an average photon number in the microwave resonator is at least 2.

14. The apparatus of claim 1, wherein a reduction in noise, as measured by Fano factor, of a photon distribution of the microwave resonator is at least 90%, and wherein an average photon number in the microwave resonator is at least 2.

15. The apparatus of claim 1, wherein a reduction in noise, as measured by Fano factor, of a photon distribution of the microwave resonator is at least 99%, and wherein an average photon number in the microwave resonator is at least 2.

16. The apparatus of claim 1, wherein the apparatus operates in a steady state configuration.

17. The apparatus of claim 2, wherein the gain medium exhibits the sharp frequency dependent gain or loss.

18. The apparatus of claim 2, wherein the absorbing medium exhibits the sharp frequency dependent gain or loss.

\* \* \* \* \*